Figure 1:
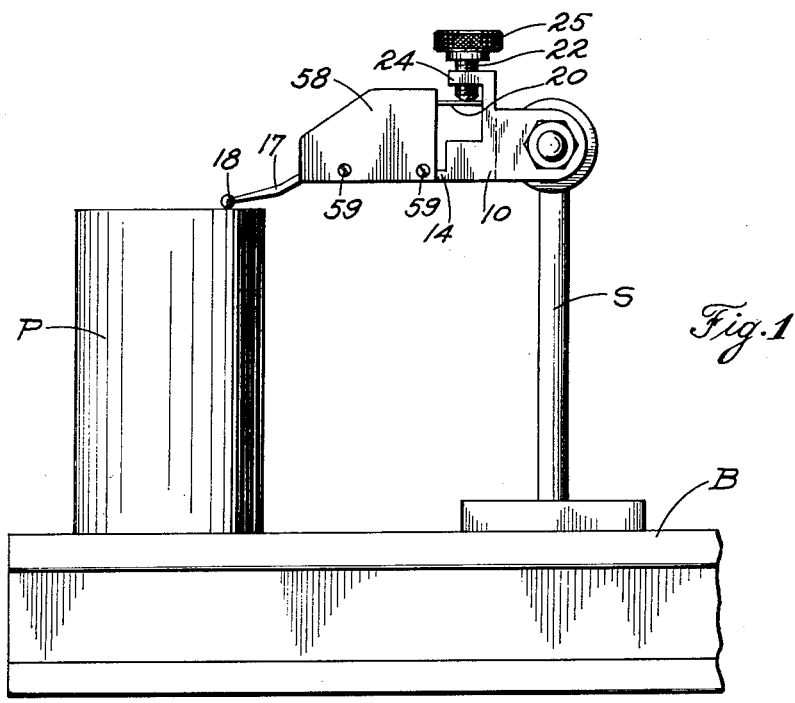

March 20, 1951 E. W. GRAHAM 2,545,881
ELECTRONIC INDICATOR

Filed Jan. 22, 1948 2 Sheets-Sheet 1

INVENTOR.
ERWIN W. GRAHAM
BY
Bosworth & Sessions
ATTORNEYS

March 20, 1951    E. W. GRAHAM    2,545,881
ELECTRONIC INDICATOR
Filed Jan. 22, 1948    2 Sheets-Sheet 2
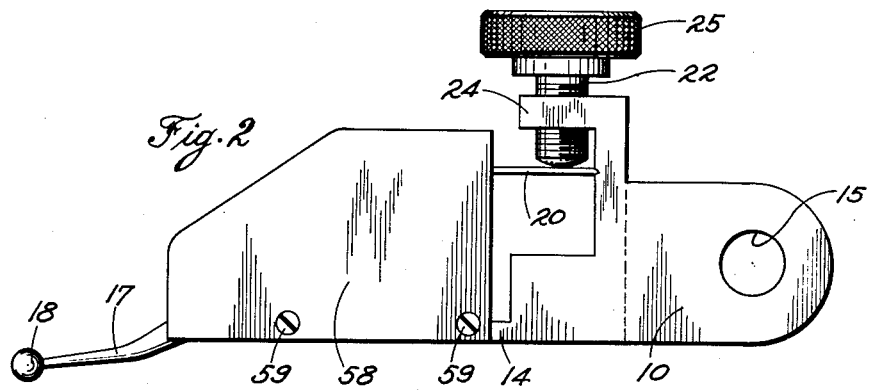
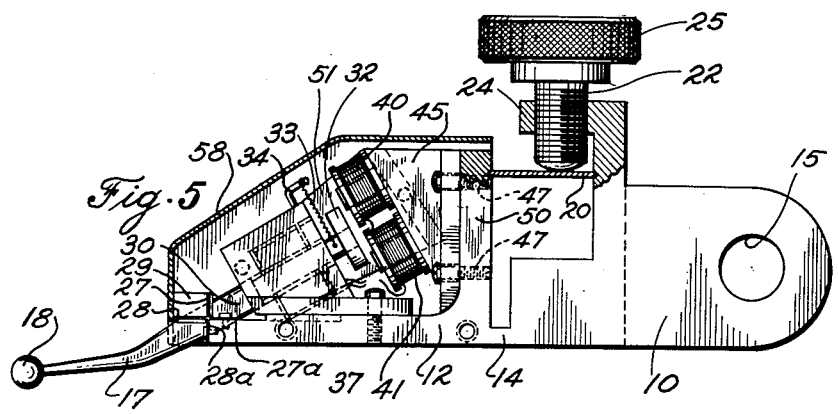
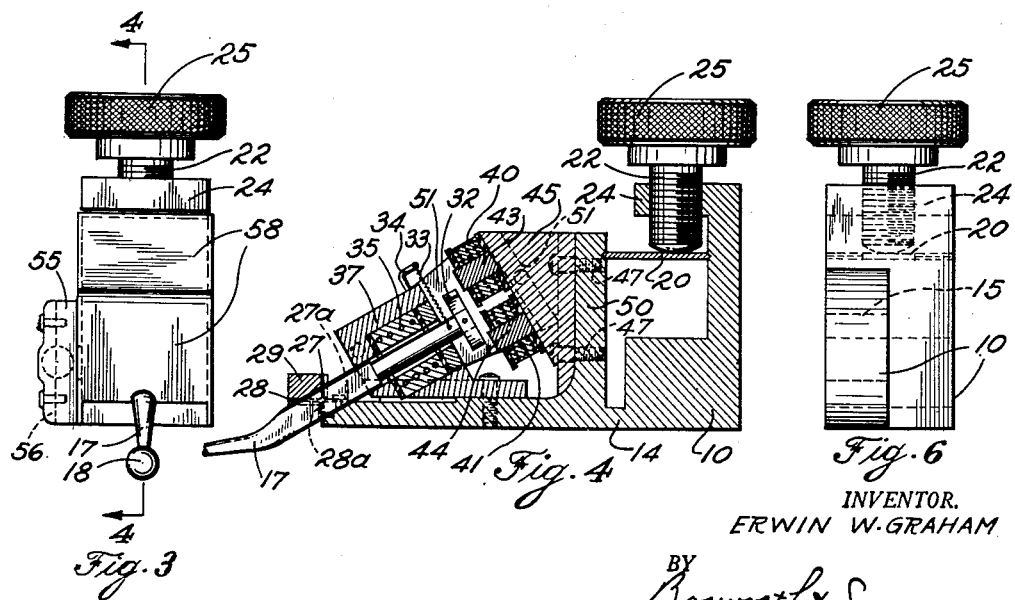
INVENTOR.
ERWIN W. GRAHAM
BY Bosworth & Sessions
ATTORNEYS Patented Mar. 20, 1951

2,545,881

UNITED STATES PATENT OFFICE 2,545,881

ELECTRONIC INDICATOR

Erwin W. Graham, Parma Heights, Ohio, assignor, by mesne assignments, to Graham-Mintel Instrument Company, Cleveland, Ohio, a corporation of Ohio Application January 22, 1948, Serial No. 3,779

8 Claims. (Cl. 171—777)

1

This invention relates to indicating instruments adapted for use in making measurements of linear dimensions and the like and more particularly to those instruments in which a small amount of mechanical motion applied to a transducer results in an electric signal that may be amplified electronically to operate a suitable indicating device such as a meter or recorder.

Taking such indications electronically with the use of a vacuum tube amplifier is old and various devices have been built to transfer a small amount of mechanical motion into a magnified signal through the medium of such an amplifier. Devices of this type have been subject to certain disadvantages in that the mechanical components of the instrument were not sufficiently rigid or rugged to be comparable to the sensitivity that could be obtained with the circuits involved. In devices of this type used for indicating the position of a surface with respect to a base plate or the like further difficulty has arisen in providing an instrument that may be mechanically adjusted with ease and accuracy to locate the feeler finger in a position to contact the surface.

A general object of the present invention is to provide an improved indicating device for indicating the position of a surface with respect to a reference plane or position. A further object is to provide a device that may be adjusted mechanically with respect to the object to be measured within close limits on its mounting after it has been initially clamped in place. Still another object is to provide a device with a two-part frame in which one part is shifted with respect to the other by flexing a connecting link that joins the two parts, thus permitting adjustment of a feeler finger carried thereby. A still further object is to provide a shiftably mounted feeler finger with a novel arrangement of an exciter coil and one or more pickup coils that cooperate with a pole piece carried by the finger to convert a mechanical motion into an electrical effect. Still an additional object of the invention is to provide a pivotally mounted feeler finger that protrudes through the center of an exciter coil and is provided at its end with a pole piece positioned between the exciter coil and two pickup coils so that a somewhat arcuate path is provided for the pole piece between the opposing faces of the coils. Another object is to provide a novel form of pivotal mount for the feeler finger.

Other objects of the invention will become apparent from the following specification when read in the light of the accompanying drawings and the novel features of the invention are summarized in the claims.

Figure 8:
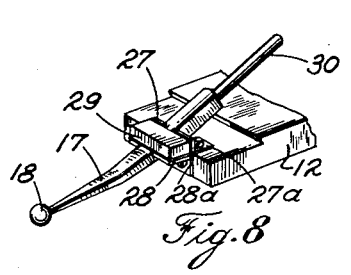
Figure 9:
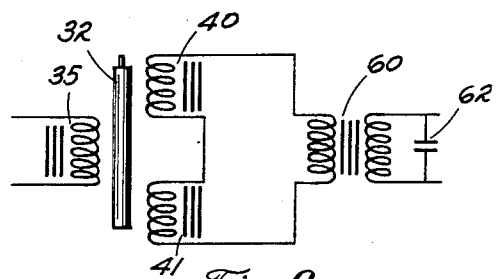
Figure 7:
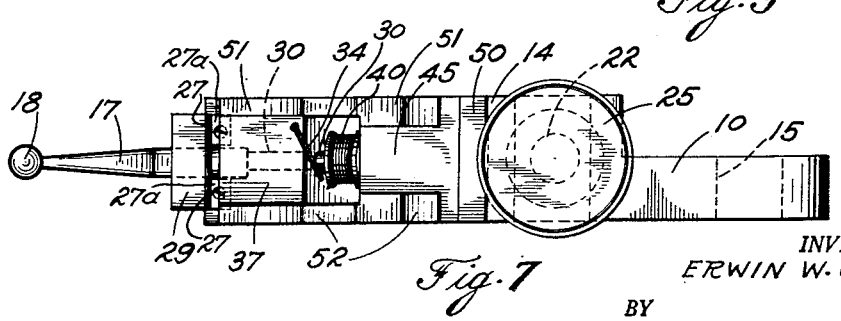

Referring now to the drawings: Figure 1 is a side elevation of the instrument in use on a bed plate; Figure 2 is a side elevation of the instrument itself; Figure 3 is an end elevation thereof; Figure 4 is a section through the instrument as indicated by the lines 4—4 on Figure 3; Figure 5 is a side elevation partly in section to show the location of the electrical parts of the instrument; Figure 6 is an end elevation opposite that shown in Figure 3; Figure 7 is a top plan view of the instrument with the transducer cover removed; Figure 8 is a detail perspective showing the manner in which the feeler finger is mounted on the frame, and Figure 9 is a wiring diagram showing the transducer circuit employed.

Generally the instrument comprises a two-part frame, one part adapted to be secured to a support S mounted on a bed plate B or the like (Figure 1), the other part carrying the transducer mechanism by which physical motion of the feeler finger on making contact with a work piece (for example piston P) is translated into an electrical effect that is either read or recorded through the use of a suitable amplifier and meter or recorder. The instrument is provided with a feeler finger that is shiftably mounted on the latter frame part. The two frame parts are connected by a deformable link that may be integral therewith or in the form of a separate member, the link being flexed by exerting force on a second connecting link so that the two frame parts shift with respect to each other about an axis through the first link, thus permitting mechanical adjustment of the feeler finger with respect to the support.

Referring now to the drawings and particularly Figures 1 and 4 the instrument comprises a multi-frame part made up of a first frame part 10 and a second part 12, the two frame parts being connected by a resilient link 14. In the drawing the parts 10, 12 and 14 are shown as made of a single piece of material but it will be understood as within the scope of the invention to make each of them separately and secure them together in any well-known manner. If desired, link 14 may be made of spring stock. The part 10 is provided with a hole 15 through which a suitable screw is placed to secure the frame to a support when the instrument is mounted for use. The other frame part is provided with a shiftably mounted feeler finger 17 having at one end a feeler ball 18 and at the other end a pole piece as hereafter described.

After the instrument has been clamped in place by a screw passing through the hole 15 the frame part 12 may be adjusted in position with respect to the frame part 10 by bending the frame at the position of the link 14. To accomplish this result a second link 20 made of spring stock is provided that rests in suitable slots in the parts 10 and 12 and normally tends to assume an upwardly convex position as distinguished from the position shown in the drawings. When the second link is either straightened or is allowed to become more convex due to its normal resiliency the spring in the resilient link 14 causes the parts 10 and 12 to assume various adjusted positions with respect to each other. The degree of flexure in the second link 20 is controlled by a set screw 22 threadingly secured in an arm 24 integral with the frame part 10. A knurled head 25 permits the set screw to be adjusted readily. As the parts 10 and 12 pivot with respect to each other at the link 14 it will be evident, as hereafter described, that they pivot about an axis that is parallel with the axis on which the finger 17 is pivotally mounted, thus insuring proper adjustment of the parts to locate the feeler finger in the desired position.

Transducer mechanism of the form shown in Figures 3 and 4 is carried by the frame part 12 although modifications may be made therein without departing from the scope of the invention. This mechanism translates mechanical motion of the finger 17 into an electric signal that is indicative of the extent of the finger's movement.

The finger 17 is pivotally mounted near its middle by means of a cross shaped leaf spring secured thereto as best shown in Figure 8 and mounted so that its center coincides with the pivotal axis of the finger. Two arms of the leaf spring indicated at 27 and 28 respectively are riveted to a cross bar 29 rigidly secured to the finger and the other two arms 27a and 28a are secured by small screws to the frame part 12, suitable clearance being provided to permit a reasonable amount of rocking motion of the finger with respect to the frame. This form of mounting permits the finger to rock with little resistance from its support and at the same time holds it in proper position with respect to the balance of the instrument at all times. The finger 17 extends inwardly of the device as indicated at 30 and is provided at its inner end with a pole piece 32 in the form of a soft iron head secured thereto. The head is normally held upwardly, the surface feeler ball 18 being positioned downwardly (Figure 4), by a light coil spring 33 secured to an arm 34 carried by the frame part 12. The inwardly extending portion 30 of the finger passes through the hollow center of an exciter coil 35 of the transducer as hereafter described. The coil is mounted inside of a transformer iron case 37 to permit accommodation of the maximum number of flux lines possible about the coil.

On the opposite side of the pole piece 32 from the coil 35 are two exciter coils 40 and 41, each mounted on suitable transformer iron cores 43 and 44 respectively, the cores being secured to a transformer iron part 45 as shown. The part 45 in turn is secured by screws 47 to an upstanding leg 50 of the frame part 12.

A closed transformer iron core is provided to extend about the coils as shown in Figure 7 so the flux lines around the assembly need not travel in an air path. This core includes parts 37 and 45 and two transformer iron straps 51 and 52 that extend between them on each side of the coils and pole piece respectively providing a closed iron flux path around them.

The accuracy of measurement or indication possible with the instrument is such that it is desirable to position the pole piece 32 accurately as close to the coils and cores thereof as possible. Thus the exposed ends of the coil cores are shaped to provide a generally arcuate path through which the pole piece may swing while at all times maintaining the same minimum clearance between the parts.

Leads from the various coils are connected to a multistrand cable entering the device at a protruding boss 55 covered by a removable cap 56. A protecting cover 58 normally encloses all of the transducer parts and is secured to the frame part 12 by suitable screws 59.

As the feeler ball 18 is shifted or rocked back and forth about the pivotal axis of the finger 17 it shifts the pole piece 32 and thereby alters the flux paths established through it and the two pickup coils 40 and 41 described above and throws the currents generated in them out of balance. The exciter coil 35 is preferably supplied with current of the same frequency as is made available to the indicator tube of the amplifier used with the device, all preferably as described in copending application Serial No. 771,528, now Patent No. 2,508,370, in the name of Michael Bozoian and assigned to my assignee.

As the movable pole piece 32 shifts out of balance in the fields of the coils 40 and 41 each pickup coil transmits an alternating sine wave of different strength to a primary 60 (Figure 9) of an iron core transformer, the two signals being 180° out of phase. Ordinarily the secondary leads of the transformer, across which a condenser 62 is placed, lead to the grids of a double triode resistance-capacitance coupled amplifier. The anode output from this stage leads, preferably, to a second resistance-capacitance coupled double triode amplifier. The leads from the anodes of the last amplifier stage go to the grids of a third double triode tube at the indicator or detector stage of the circuit. A meter, recorder or other indicating device may be connected across the anodes of the indicator tube, it being noted, as pointed out above, that the indicator tube and the pickup coil 35 are supplied with alternating current of the same frequency.

From the foregoing description it will appear that when the ball 18 of the feeler finger 17 makes contact with an object during use the extent to which the finger is rocked about its pivot is electrically indicated by virtue of the transducer mechanism described. Various modifications may be made in the preferred form of the invention as described above without departing from the scope thereof.

I claim:

1. In an indicating device, a frame member comprising two parts joined together by a deformable section integrally joined to both said parts and constituting a flexible link, said parts being spaced apart in the region adjacent said link, one part of said frame member being adapted to be secured fixedly to a support, the other part of said frame member having a feeler finger pivotally mounted thereon and projecting therefrom in a direction away from said link, a second, normally arched, link extending between said parts where said parts are spaced apart, and screw means for applying a force to said second link to straighten the same, thereby causing said second link to exert a force between said parts and deforming said flexible link to move one of said parts with respect to the other to adjust the position of the feeler finger with respect to the support.

2. In an indicating device, a frame member comprising two parts joined together by a deformable section constituting a flexible link, said parts being spaced apart in the region adjacent said link, one part of said frame member being adapted to be secured fixedly to a support, the other part of said frame member having a feeler finger mounted thereon, a second, normally arched, link extending between said parts where said parts are spaced apart, and means for applying a force to said second link to straighten the same, thereby causing said second link to exert a force between said parts and deforming said flexible link to move one of said parts with respect to the other to adjust the position of the feeler finger with respect to the support.

3. An indicating device comprising a two part frame connected by a flexible link, one part of said frame being adapted to be secured to a support, a feeler member carried by the other of said parts and movable with respect thereto, a second link extending between said parts and means to deform said second link and to retain said second link in deformed position to cause said second link to exert a force between said parts of said frame in a zone spaced from said first link to bend said first link to alter the angular position of one of said parts with respect to the other of said parts thereby to adjust the position of said feeler member with respect to said support.

4. An indicating device comprising a two part frame connected by a flexible link, one part of said frame being adapted to be secured fixedly to a support, a pivotally mounted feeler member carried by the other of said parts and movable with respect thereto, and adjustable means for exerting a force between said parts of said frame in a zone spaced from said link to bend said link to pivot said parts with respect to each other about an axis parallel to the axis of said pivotally mounted feeler member to alter the angular position of one part with respect to the other part and adjust the position of said feeler member with respect to a support.

5. A measuring device comprising a transducer mechanism including a frame, an exciter coil with a hollow core carried by said frame, a feeler finger pivotally mounted on said frame with an end thereof extending through said core, a magnetic pole piece fixed on said end, two pickup coils carried by said frame on the opposite side of said pole piece from said exciter coil, the adjacent ends of all said coils defining an arcuate path through which said pole piece may swing in directions generally transverse to the axis of said pickup coils and a closed loop of magnetic material surrounding said coils.

6. A measuring device comprising a transducer mechanism including a frame, an exciter coil with a hollow core carried by said frame, a feeler finger pivotally mounted on said frame with an end thereof extending through said core, a magnetic pole piece fixed on said end, two pickup coils carried by said frame on the opposite side of said pole piece from said exciter coil, the adjacent ends of all said coils defining a path through which said pole piece may swing in an arcuate path in directions generally transverse to the axis of said pickup coils.

7. A measuring device comprising a transducer mechanism including a frame, an exciter coil carried by said frame, a feeler finger pivotally mounted on said frame with an end thereof extending generally parallel to the axis of said exciter coil, a magnetic pole piece fixed on said end, two pickup coils carried by said frame adjacent said pole piece, the adjacent ends of all said coils defining a path through which said pole piece may swing in an arcuate path in directions generally transverse to the axis of said pickup coils.

8. In an indicating device, a frame member comprising two parts joined together by a flexible link, said parts being spaced apart in the region adjacent said link, one part of said frame member being adapted to be secured fixedly to a support, the other part of said frame member having a feeler finger mounted thereon, a second link extending between said parts where said parts are spaced apart, and means for applying a force to said second link to deform the same from its normal shape, thereby causing said second link to exert a force between said parts and deforming said flexible link to move one of said parts angularly with respect to the other to adjust the position of the feeler finger with respect to the support.

ERWIN W. GRAHAM.

REFERENCES CITED

The following references are of record in the file of this patent:

UNITED STATES PATENTS

| Number | Name | Date |
| --- | --- | --- |
| 2,065,951 | Terry | Dec. 29, 1936 |
| 2,240,184 | Hathaway | Apr. 29, 1941 |
| 2,268,956 | Mestas | Jan. 6, 1942 |
| 2,428,234 | Mapp | Sept. 30, 1947 |